United States Patent
Arthur et al.

(10) Patent No.: US 8,133,295 B2
(45) Date of Patent: Mar. 13, 2012

(54) METHOD AND APPARATUS FOR LEAD SMELTING

(75) Inventors: Philip Scott Arthur, The Gap (AU); William John Errington, Samford (AU)

(73) Assignees: Yunnan Metallurgical Group, Kunming, Yunnan Province (CN); Xstrata Technology Pty Ltd, Brisbane, Queensland (AU)

( * ) Notice: Subject to any disclaimer, the term of this patent is extended or adjusted under 35 U.S.C. 154(b) by 295 days.

(21) Appl. No.: 12/098,227

(22) Filed: Apr. 4, 2008

(65) Prior Publication Data

US 2008/0250900 A1 Oct. 16, 2008

Related U.S. Application Data

(63) Continuation-in-part of application No. PCT/AU2006/001460, filed on Oct. 5, 2006.

(30) Foreign Application Priority Data

Oct. 6, 2005 (AU) ................................. 2005905513

(51) Int. Cl.
*C22B 4/04* (2006.01)
*C22B 4/08* (2006.01)

(52) U.S. Cl. ....................... 75/10.35; 266/186

(58) Field of Classification Search ................. 75/10.35; 266/186
See application file for complete search history.

(56) References Cited

U.S. PATENT DOCUMENTS

| | | | | |
|---|---|---|---|---|
| 4,514,222 A | * | 4/1985 | Denholm et al. | 75/696 |
| 4,514,223 A | | 4/1985 | Kawakita et al. | 75/77 |
| 4,519,836 A | * | 5/1985 | Sychev et al. | 75/696 |
| 4,521,245 A | * | 6/1985 | Yarygin et al. | 75/586 |
| 4,737,186 A | | 4/1988 | Krogerus et al. | 75/10.35 |

FOREIGN PATENT DOCUMENTS

| | | |
|---|---|---|
| AU | 199061094 A1 | 11/1990 |
| CN | 1131699 A | 9/1996 |
| CN | 1334349 A | 2/2002 |
| CN | 1530453 A | 9/2004 |
| CN | 1584075 A | 2/2005 |
| GB | 921632 | 3/1963 |
| GB | 2 196 649 A | 5/1988 |

OTHER PUBLICATIONS

IPRP for PCT/AU 2006/001460 dated Jan. 11, 2008.

(Continued)

*Primary Examiner* — Jie Yang
(74) *Attorney, Agent, or Firm* — Winston & Strawn LLP

(57) ABSTRACT

A method for producing lead involves feeding lead concentrate, flux and solid fuel passing to a feed preparation unit. The prepared, mixed feed is then passed to a lead smelting furnace, such as an ISASMELT furnace or other top entry, submerged lance furnace. Air or oxygen, is injected into the molten charge in the ISASMELT furnace via the submerged lance. The feed mixture is converted into lead bullion and a lead-containing slag. The slag removed from the furnace is formed into lumps having a desirable size range. The slag lumps, together with coke and flux are fed into a blast furnace. In the blast furnace, the slag is converted into lead bullion and discard slag. The lead bullion removed may be subsequently fed to a lead refinery for further treatment.

14 Claims, 1 Drawing Sheet

OTHER PUBLICATIONS

K. Ramus, et al., "Lead Smelting at Mount Isa Mines Limited, Mount Isa Qld", Australasian Mining and Metalurgy, The Sir Maurice Mawby Memorial Volume, $2^{nd}$ Edition, vol. 1, pp. 554-558 (1993).

McLoughlin, B. C., et al., "Development of Optimum Fluxing Procedures for Isamine Lead Concentrates",Lead-Zinc-Tin '80 Symposium—15 pages (1980).

Errington, W. J., et al., "The Isasmelt lead smelting process", pp. C1-C6 (1987).

Jahanshahi,S., et al., Process Chemistry Studies of the Isasmelt Lead Reduction Process, Non-Ferrous Smoking Symposium, Port Pirie South Australia, pp. 33-40 (1989).

Moriya, K., "Lead Smelting and Refining its Current Status and Future", Lead-Zinc '80, The Minerals, Metals & Materials Society,, pp. 23-38 (1990).

Matthew, S. P., et al., "The Continuous Isasmelt Lead Process, Lead-Zinc '90", The Minerals, Metals & Materials Society, pp. 889-901 (1990).

Davey, T. R. A., "Towards AD 2000", Lead-Zinc '90, The Minerals, Metals & Materials Society, pp. 39-55 (1990) [with 1 page LZ 90, Section B, Precious Metsl Recovery in the Zinc Industry].

Short, W. E., Commercial Application of Ausmelt's top submerged lance technology in the lead industry, Lead Into the Future, IMM Conference, Oct. 16-17, 1996, pp. 1-12.

Errington, W. J., "Isasmelt technology—current status and future development", The Journal of the South African Institute of Mining and Metallurgy, pp. 161-167 (1997).

WBG Paper, Lead and Zinc Smelting, Pollution Prevention and Abatement Handbook, World Bank Group, pp. 332-336 (1998).

Floyd, J. M., et al., "An update of Ausmelt Technology for zinc and lead processing", Zinc and Lead Processing, $28^{th}$ Annual Hydrometallurgical Meeting, The Metallurgical Society of CIM, pp. 14 (1998).

Mounsey, E. N., et al., "A Review of Ausmelt Technology for Lead Smelting", pp. 1-21(2000).

Matusewicz, R., "Lead Smelting, Copper Smelting and Copper Converting Using Ausmelt Technology",Paper for NMD/ATM (2001) 24 pages.

Robert, J., et al., Recycling of Lead using Ausmelt Techology, Proceedings of EMC. pp. 1-16 (2001).

Arthur, P. S., et al.,"Isasmelt™ —25 Years of Continuous Evolution", History of the Isasmelt Process, pp. 1-24 (2005).

Hageluken Ch. "Recycling of Electronic Scrap at Umicore Precious Metals Refining", Acta Metallurgica Slovaca, vol. 12, pp. 111-120 (2006).

Sutherland, C.A., :Lead, Ullman's Encyclopedia of Industrial Chemistry, Wiley-VCH, 6 Edition, pp. 1-48 (2002).

Dawson, R. D., "Technical Developments from 100 years of Lead Smelting at Port Pirie",, Non-Ferrous Smelting Symposium, Port Pirie South Australia, (1989) with p. 163 Lead Zirconate Titanate excerpt.

Gilchrist, J. D., "Extraction Metallurgy", Third Edition, pp. 346-349 (1989).

Tottle, C. R., An Encyclopaedia of Metallurgy and Materials (1984) 1 page.

Butts, Allison, "Metallurgical Problems," Metallurgy of Lead, Second Edition, p. 305, (1943).

Nilmani, M., et al., Sustainable Developments in Metals Processing, Floyd Symposium, pp. 1-5 and pp. 73-94 (2005).

Article; Isasmelt™ CYMG Lead Smelter, pp. 1-2 wwww.isasmelt.com.au (Mar. 9, 2010).

Brochure: "Xstrata Technology and the Current Market", Xstrata Technology Update, www.xstratatech.com,Edition 8, pp. 1-8 (2007).

News Release Article, "Xstrata Technology to Supply Isasmelt™ Plant in China", (Jun. 24, 2009) 2 pages.

Jak, E., et al., "Experimental Study of Phase Equilibria in the "FeO"—ZnO—(CaO+$SiO_2$)System with CaO/$SiO_2$ Weight Ratios of 0.71 at Metallic Iron Saturation ", Metallurgical and Materials Transactions, vol. 33B, pp. 865-876 (2002).

Jak, E., et al., "Experimental Study of Phase Equilibria in the "FeO"—ZnO—(CaO+$SiO_2$)System with CaO/$SiO_2$ Weight Ratios of 0.33, 0.93, and 1.2 in Equilibrium with Metallic Iron", Metallurgical and Materials Transactions, vol. 33B, pp. 877-890 (2002).

Jak, E., et al., "The Effect of the CaO/$SiO_2$ Ratio on the Phase Equilibria in the ZnO—"$Fe_2O_3$"—(PbO+CaO+$SiO_2$) System in Air: CaO/$SiO_2$=0.1, PbO/(CaO+$SiO_2$)=6.2, and CaO/$SiO_2$=0.6, PbO (CaO+$SiO_2$)=4.3", Metallurgical and Materials Transactions B, vol. 34B, pp. 369-382 (2003).

Jak, E., et al., "Experimental Liquidus in the PbO—ZnO—"$Fe_2O_3$"—(CaO+$SiO_2$) System in Air, with CaO $Sio_2$=0.35 and PbO/(CaO+$SiO_2$)=3.2", Metallurgical and Materials Transactions B, vol. 33B, pp. 851-863 (2002).

Errington, B., et al., "The ISA-YMG Lead Smelting Process", Xstrata Technology, pp. 1-14 (2005).

Moffatt, R.J., Antimony recovery and lead alloy production at Pasminco Metals-BHAS, Port Pirie, SA, Other Metals, The Sir Maurice Mawby Memorial Volume, $2^{nd}$ Edition, vol. 2, p. 1215 (1993).

G.Saint, et al., "Lead Smelting and Refining by Pasminco Metals-BHAS at Port Pirie, SA", Australasian Mining and Metallurgy, The Sir Maurice Mawby Memorial Volume, $2^{nd}$ Edition, vol. 1, pp. 559-563 (1993).

International Search Report and Written Opinion for PCT/AU2006/001460, Nov. 2006.

Abstract: R. Wang et al., CN 1530453 A (Accession No. 2005-021875/03), "Treatment of Slag From Smelting Lead and Antimony", Sep. 2004.

Abstract: Y. Dong et al., CN 1584075-A (Accession No. 2005-387344/40), "Powder Fuel Spray Melting Method for Slegs of Top Blowing Immersion Melting Furnace In Blast Furnace", May 2004.

Abstract: Y. Dong et al., CN 1334349-A (Accession No. 2002-293076/34), "Blast Furnace Smelting Technology for Lead-Enriched Slags", May 2001.

Abstract: F. Dong et al., CN 1131699-A (Accession No. 98/000495/01), "Lead Smelting Technology", Nov. 1995.

Abstract: E.N. Mounsey et al., "A Review of Ausmelt Technology for Lead Smelting", 2000.

Abstract: B. Errington et al., "The ISA-YMG Lead Smelting Process", 2005.

* cited by examiner

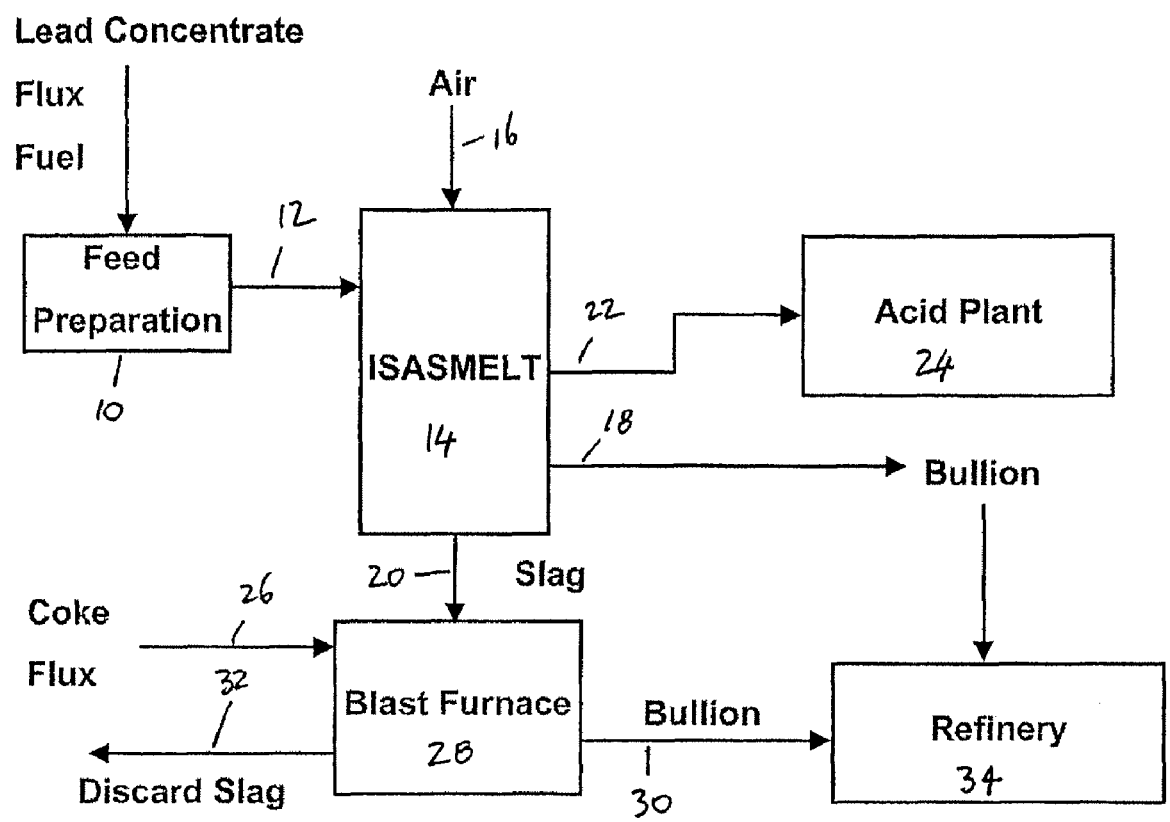

METHOD AND APPARATUS FOR LEAD SMELTING

CROSS-REFERENCE TO RELATED APPLICATIONS

This application is a continuation-in-part of international application PCT/AU2006/001460 filed Oct. 5, 2006, the entire content of which is expressly incorporated herein by reference.

FIELD OF THE INVENTION

The present invention relates to a method for producing lead from a material containing lead sulphide. In another aspect, the present invention also relates to an apparatus for producing lead.

BACKGROUND TO THE INVENTION

The most important lead ore is galena, which consists primarily of lead sulphide. Production of lead from such ores typically involves a froth flotation step to form a lead sulphide containing concentrate. The lead sulphide containing concentrate typically includes lead sulphide, zinc sulphide, iron sulphide, silica and calcium oxide. The concentrate is subsequently smelted to produce lead metal.

Conventional lead smelting plants include a sinter plant. The concentrate passes through the sinter plant prior to the smelting step in a blast furnace. In the sinter plant, the concentrate is burned or roasted to produce an off gas containing sulphur dioxide and sintered product containing lead oxide, silica and other oxides. The sinter plant oxidizes the concentrate and removes the bulk of the sulphur from the concentrate.

Typical sinter plants have a moving grate on which the concentrate rests. The moving grate moves over a number of wind boxes, through which a current of air blows upwards. The sinter plant requires special feed control, particularly of particle size and moisture content, in order to ensure proper operation of the sinter plant. Very large sinter recycle ratios are also required in order to control the amount of heat generated in the sinter plant. It is important to control the operation of the sinter plant in order to avoid the formation of any lead metal in the sinter plant, as this would block the moving grate within the sinter plate.

In the sinter plant, the sulphide species are largely converted to oxides and fine powders are agglomerated into lumps. The agglomerated particles may be broken up to a size convenient for use in the downstream blast furnace. The sinter plant gases are routed to gas cleaning equipment for recovery of any fumes and for the removal of sulphur containing gases to form sulphuric acid.

The sinter leaving a sinter plant is subsequently used as a feed to a lead smelting blast furnace. The sinter is mixed with a carbonaceous material (typically coke) and a flux (such as limestone) and fed into the top of a blast furnace. In the blast furnace, air is injected through tuyeres located towards the bottom of the blast furnace. As the air passes upwardly through the furnace, it causes combustion of some of the coke to supply energy for the smelting process. The presence of coke ensures that a reducing atmosphere is largely maintained within the reactive zones of the furnace, thereby reducing the lead oxide in the sinter to lead metal. Lead metal is tapped off from the bottom of the furnace and either cast into ingots or collected in ladles for transferring to a lead refining process. The lead metal that is collected from the blast furnace is conventionally referred to as lead bullion, because that lead metal acts as a collector for any precious metals in the concentrate.

The above described conventional process for producing lead (incorporating a sintering plant and a blast furnace) is used to recover approximately 80% of worldwide lead production.

Other processes for recovering lead from sulphide ores and concentrates have also been developed. These processes include Kivcet process, the QSL process and the ISASMELT process.

The ISASMELT process utilises gas injection into melts via a top entry submerged lance. Injection of gases via the top entry submerged lance produces a very turbulent bath in which high intensity smelting or reduction reactions take place. In the ISASMELT process, a two stage process may be utilised. In the two stage process, lead concentrate is added directly to a molten slag bath in a smelting furnace. This produces a lead containing slag, which is transferred to a second furnace in which that lead containing slag is reduced to form lead bullion. Both furnaces use top entry submerged lances for injection of gases.

The ISASMELT process can also be used to directly reduce some of the concentrate added to the smelting furnace to lead bullion. Typically, concentrates containing high levels of lead, such as between 55% to 80%, but more preferably between 60% to 75% have been processed in this manner, although concentrates having lead concentrations outside this range may also be processed using direct smelting.

It is an object of the present invention to provide an alternative lead smelting method and apparatus for producing lead from lead sulphide containing materials.

SUMMARY OF THE INVENTION

In a first aspect, the present invention provides a method for producing lead from a material containing lead sulphide comprising the steps of:

(a) feeding the material containing lead sulphide to a lead smelting furnace to produce a lead-containing slag and lead bullion;

(b) removing the lead bullion from the lead smelting furnace (c) removing the lead-containing slag from the lead smelting furnace; and (d) feeding the lead-containing slag to a blast furnace wherein the lead-containing slag is converted into lead bullion and a discard slag.

In step (a) of the process of the present invention, the feed material containing lead sulphide is fed into a lead smelting furnace. In this furnace, the feed material is processed under conditions such that a proportion of the lead sulphide is converted into lead metal and another proportion of the lead sulphide is converted such that it reports to the slag in the furnace. Thus, the slag in the lead smelting furnace is a lead-containing slag. The lead in the slag is normally in the form of $PbSiO_4$. It can be seen that the products leaving the lead smelting furnace include lead bullion, a lead-containing slag and off gases. The off gases will typically contain sulphur dioxide. Accordingly, the off gases are suitably treated to remove sulphur dioxide therefrom. The sulphur dioxide is preferably used to produce sulphuric acid.

The off gases leaving the lead smelting furnace may also contain some lead fume (which may be in the form of fumed lead sulphide). The lead fume is recovered to meet applicable environmental standards and also to enable the lead fume to be recycled to the lead smelting furnace to minimise loss of lead from the feed material.

In one preferred embodiment of the present invention, the lead smelting furnace comprises a top entry submerged lance furnace. Such a furnace suitably comprises a simply, stationary, refractory-lined furnace. The top entry submerged lance is used to inject oxygen (which may be in the form of air) and fuel into a bath of molten slag. One such top entry submerged lance technology is an ISASMELT furnace, (developed by Mount Isa Mines), available for design and installation by Xstrata Technology. Other top entry submerged lance technology smelters also exist and could be used in the present invention as well.

Although an ISASMELT furnace is a preferred furnace for use as the lead smelting furnace, it will be appreciated that any other furnace that is capable of directly producing lead bullion and lead containing slag from lead sulphide containing feed materials may also be used in step (a) of the present invention.

The lead bullion produced in step (a) is suitably removed from the lead smelting furnace and either directly recovered or sent for further refining to increase the purity thereof. The lead bullion may be removed continuously, it may be removed when the amount of lead bullion in the smelting furnace reaches a set level or it may be removed after set time periods.

The slag formed in the lead smelting furnace is also removed from the lead smelting furnace and subsequently used as a feed material to the blast furnace. The slag removed from the lead smelting furnace is suitably cooled (or allowed to cool), whereupon it solidifies. Appropriate size reduction of the solidified slag may take place in order to obtain lumps of the lead-containing slag having a size distribution required for use as a feed material to the blast furnace. The molten slag may be cast and subsequently broken up using appropriate size reduction equipment, or it may be cast into appropriately sized moulds. Alternatively, the slag may also be granulated and then agglomerated or pelletized to enable it to be fed to the blast furnace.

The lead containing slag is used as a feed material to the blast furnace. Suitably, the lead slag from the lead smelting furnace comprises the main part or all of the lead-containing feed material fed to the blast furnace. In the blast furnace, the lead-containing slag is suitably fed together with metallurgical coke into the top of the blast furnace. The slag and the coke are suitably sized within a desired size range to ensure an even mix thereof and to ensure the porosity of the material in the shaft of the blast furnace is maintained as the feed moves down within the furnace. Tuyeres in the lower part of the blast furnace burn the coke to carbon monoxide, which reacts with the slag just above the tuyeres to produce lead metal and a discard slag. The discard slag typically contains less than 3% lead oxide, preferably less than 2% lead oxide. The rising hot gases from the tuyeres zone pre-heat the feed mix as it travels slowly down the shaft of the furnace. The blast furnace gases leave the furnace at a relatively low temperature due to this heat exchange. This improves the efficiency of the blast furnace.

As the slag reaches a zone near and just above the tuyeres, the slag will start to melt. The reactions that convert the slag from the lead smelting furnace into lead metal and the discard slag take place in this zone of molten slag material. These reactions may be maximised by increasing the temperature in this region (for example, by oxygen enrichment of the blast air) and/or by maintaining more reducing conditions, for example, by the injection of pulverised coal through the tuyeres. The furnace may also be designed to maximise the residence time for reactions in this area.

The lead bullion formed in the blast furnace is removed from the blast furnace, either by continuous drainage or periodical tapping. Similarly, the discard slag is also removed from the blast furnace. The lead bullion that is recovered from the blast furnace may be cast into ingots or passed to a lead refinery for further refining.

In the method of the present invention, a lead smelting furnace is used to convert a lead sulphide containing feed material partly to lead bullion and partly to a lead containing slag. Typical lead concentrates, which may form a feed material to the lead smelting furnace, normally have the following range of compositions:

| Species | Pb | Zn | Fe | S | CaO | SiO2 |
|---------|------|-----|------|-------|---------|-------|
| Wt. % | 50-75 | 2-8 | 5-13 | 15-23 | 0.2-0.5 | 1.5-3 |

The minerals present in the lead concentrates can be regarded as essentially PbS, ZnS, FeS, $FeS_2$, $CaCO_3$ and $SiO_2$. The lead concentrate, together with air, carbonaceous material and fluxing agents (typically silica) are added to the lead smelting furnace. In the lead smelting furnace, the zinc and iron sulphides in the lead concentrates are oxidised to ZnO and $Fe_2O_3$, while the PbS is partially oxidised to produce Pb metal plus PbO. These oxides react with the silica to form a molten slag that can be regarded as a mixed solution of $PbSiO_4$, $Zn_2SiO_4$ and $Fe_2SiO_4$. The slag may also contain solid crystals. For example, zinc ferrite ($ZnFe_2O_4$) crystals may form if there is insufficient silica to fully flux the ZnO and $Fe_2O_3$. If there is a high CaO content in the slag, then melilite crystals (typically $Ca_2MgSiO_7$) can precipitate. Zinc ferrite crystals are equiaxed while melilite crystals are typically long and lath-like.

Although the slag formed in the lead smelting furnace typically contains silicates of lead, zinc and iron, composition of the slag is normally reported in terms of the equivalent amount of the corresponding oxides of lead, zinc and iron.

In one embodiment, the method of the present invention is operated such that the lead-containing slag produced in the lead smelting furnace has a lead oxide content in the range of 40-55 weight % of the total slag and a $CaO/SiO_2$ ratio of less than 0.4 and zinc content of 7-10 weight %. This slag will contain an amount of solid zinc ferrite crystals, typically around 15 to 30 volume %, more typically about 20 volume %, of solid zinc ferrite crystals. This slag is very fluid at 1050° C. The slag also has the special property that, when splashed up over the refractories lining the wall of the furnace by the action of the submerged lance, it deposits a protective layer of zinc ferrite over the furnace walls. This ensures that minimal or no refractory wear occurs in the lead smelting furnace. This slag allows the operation to be carried out at a relatively low temperature, thus minimising fuel requirements. The high fluidity of the slag means that the volatile PbS is rapidly incorporated into the slag bath, almost totally suppressing the fuming of lead as PbS.

In this embodiment of operation, the slag characteristics do not change significantly with the cooling rate of the slag. Thus, this slag can be rapidly quenched after being removed from the lead smelting furnace and in being prepared for the blast furnace.

Due to the chemical nature of the slag formed in the lead smelting furnace in this embodiment of the invention, to achieve a rapid reduction of the lead slag in the blast furnace, it is necessary to increase the $CaO/SiO_2$ ratio in the discard slag formed in the blast furnace to greater than 0.6. Thus, it is normally necessary to add lime in some form directly to the blast furnace. The lime may suitably be in the form of burnt lime (pebbles) that assist in maintaining the permeability of the material in the blast furnace shaft.

In another embodiment of the method of the present invention, the lead smelting furnace is operated to produce a slag having similar mineralogical properties to normal lead sinter. This lead containing slag formed in the lead smelting furnace suitably has a lead oxide content in the range of 45 to 55% by weight and a $CaO/SiO_2$ ratio of greater than 0.6. The lead-containing slag may be treated to produce a mineralogical structure consisting of an interlocking network of needle or lath-like melilite crystals enclosing a lead silicate glass phase. For example, the lead containing slag removed from the lead smelting furnace may be cooled at a cooling rate of less than 50° C. per minute. This slag has similar softening properties to conventional lead sinter and behaves in a similar way to conventional lead oxide sinter in the blast furnace. Additional lime fluxing in the blast furnace is not required due to the relatively high $CaO/SiO_2$ ratio in the slag.

In a second aspect, the present invention provides a plant for producing lead from a material containing lead sulphide, the plant comprising a lead smelting furnace for forming lead and a lead containing slag from the material containing lead sulphide, feed means for feeding the material containing lead sulphide to the lead smelting furnace, slag removal means for removing the lead containing slag from the lead smelting furnace, a blast furnace for converting the lead containing slag to lead and a discard slag and slag feeding means for feeding the lead containing slag to the blast furnace.

The lead smelting furnace is suitably a top entry submerged lance furnace. An example of a top entry submerged lance furnace is a furnace designed by Xstrata Technology under the name ISASMELT. Other top entry, submerged lance furnaces may also be used. The slag removal means removal of the lead containing slag from the lead smelting furnace. The slag is then suitably treated in a slag treatment means to form the slag into a form suitable for feeding to the blast furnace. The slag treatment means suitably comprises a caster for casting the molten slag and cooling the molten slag to cause the molten slag to solidify. In one embodiment, the caster casts the molten slag into separate lumps of the desired size range for feeding to the blast furnace. In another embodiment, the solidified slag from the caster passes through a particle size reduction means to form lumps of solidified slag having the desired size range for feeding to the blast furnace. Alternatively the slag can be granulated, then undergo an agglomeration or a pelletization process for feeding the blast furnace. The blast furnace of the present invention will also be provided with other feeding means for feeding coke (or other carbonaceous material), any fluxing agents that may be required and any oxygen containing gas streams to the blast furnace. These are essentially conventional and need not be described further.

BRIEF DESCRIPTION OF THE DRAWINGS

FIG. 1 shows a flowsheet of a process and a plant in accordance with an embodiment of the present invention.

DETAILED DESCRIPTION OF THE PREFERRED EMBODIMENTS

The attached drawing has been provided for the purpose of illustrating a preferred embodiment of the present invention. It will be understood that the present invention should not be considered to be limited solely to the embodiment shown in the attached drawing.

The flowsheet shown in FIG. 1 shows lead concentrate, flux and solid fuel passing to a feed preparation unit 10. The prepared, mixed feed is then passed via line 12 to a lead smelting furnace 14. In the flow sheet shown in FIG. 1, the lead smelting furnace 14 is an ISASMELT furnace. As will be known to those skilled in the art, an ISASMELT furnace is a top entry, submerged lance furnace. Air 16, which may be enriched with oxygen, is injected into the molten charge in the ISASMELT furnace 14 via the submerged lance.

In the ISASMELT furnace 14, the feed mixture fed to the furnace is converted into lead bullion and a lead-containing slag. The lead bullion is removed via a taphole or weir 18. The slag is removed via a taphole or weir 20. Off gases from the ISASMELT furnace 14 may be removed via an off gas system 22 and fed to an acid plant 24 to remove sulphur-containing compounds therefrom and produce sulphuric acid. Although not shown in FIG. 1, any lead fume contained in the off gases 22 may also be recovered in accordance with conventionally known techniques.

The slag 20 removed from the ISASMELT furnace is suitably formed into lumps having a desirable size range. This may occur by allowing the slag to solidify and subsequently crushing or grinding the slag, by casting the slag into lumps having the appropriate size ranges or by granulating the slag followed by agglomeration or pelletization. The slag lumps 20, together with coke and flux 26 are fed into a blast furnace 28. In the blast furnace 28, the slag is converted into lead bullion that is removed via a taphole or weir 30 and discard slag that is removed via a taphole 32.

The lead bullion removed at 18 and 30 may be subsequently fed to a lead refinery 34 for further treatment.

Those skilled in the art will appreciate that the present invention may be susceptible to variations and modifications other than those specifically described. It is to be understood that the present invention encompasses all such variations and modifications that fall within its spirit and scope.

What is claimed is:

1. A method for producing lead from a material containing lead sulphide comprising the steps of:
    a) feeding the material containing lead sulphide to a top entry submerged lance lead smelting furnace to produce lead bullion and a lead containing slag that contains lead silicate, wherein the material that is fed to the lead smelting furnace contains from 50 to 75% by weight Pb;
    b) removing the lead bullion from the lead smelting furnace;
    c) removing the lead containing slag from the lead smelting furnace, cooling the lead slag at a cooling rate of less than 50° C. per minute, and forming the lead containing slag into lumps by casting or by granulating followed by agglomeration or pelletizing, with the formed lumps having a size distribution suitable for use as feed material to a blast furnace, said lead containing slag having a lead oxide content in the range of 45-55 weight % of the total slag, a $CaO/SiO_2$ ratio of greater than 0.6, and a mineralogical structure consisting of an interlocking network of needle or lath-like melilite crystals enclosing a lead silicate glass phase; and
    d) feeding the lumps of lead containing slag to a blast furnace, the lead slag from the lead smelting furnace comprising the main part or all of the lead-containing feed material fed to the blast furnace, wherein the lead containing slag is converted into lead bullion and a discard slag.

2. A method as claimed in claim 1 wherein the top entry submerged lance injects oxygen or air and fuel into a bath of molten slag.

3. A method as claimed in claim 1 wherein a fluxing agent is added to the lead smelting furnace.

4. A method as claimed in claim 1 wherein the lead-containing slag (i) has a zinc content of 7-10 weight %.

5. A method as claimed in claim 4 wherein the lead-containing slag contains an amount of solid zinc ferrite crystals of around 15 to 30 volume %.

6. A method as claimed in claim 4 wherein the lead-containing slag is rapidly quenched after being removed from the lead smelting furnace to form feed particles which are agglomerated or pelletized into the lumps for feeding to the blast furnace.

7. A method as claimed in claim 4 wherein the ratio of $CaO/SiO_2$ in the discard slag formed in the blast furnace is adjusted to greater than 0.6.

8. A method as claimed in claim 7 wherein lime is added to the blast furnace to adjust the $CaO/SiO_2$ ratio.

9. A method as claimed in claim 8 wherein the lime is in the form of burnt lime pebbles that assist in maintaining the permeability of the material in the blast furnace shaft.

10. A method as claimed in claim 1 wherein the lead-containing slag is fed together with metallurgical coke into the top of the blast furnace.

11. A method as claimed in claim 1 wherein the discard slag contains less than 3% lead oxide.

12. A method as claimed in claim 1 wherein the lead bullion produced in step (a) is removed from the lead smelting furnace and either directly recovered or sent for further refining to increase the purity thereof.

13. A method as claimed in claim 1 wherein the lead bullion removed from the blast furnace is recovered directly or passed to a lead refinery for further refining.

14. A method as in claim 1, which further comprises feeding the lumps into the furnace together with a fluxing agent and metallurgical coke.

* * * * *